Oct. 18, 1932.   E. H. ANGIER   1,882,713

MULCHING

Filed Oct. 4, 1928

Inventor:
Edward H. Angier,
by Emery, Booth, Janney & Varney
Attys.

Patented Oct. 18, 1932

1,882,713

UNITED STATES PATENT OFFICE

EDWARD H. ANGIER, OF FRAMINGHAM, MASSACHUSETTS

MULCHING

Application filed October 4, 1928. Serial No. 310,409.

This invention relates to horticulture and the object is to provide for the mulching of plants in a manner offering various advantages, some of which will appear as the description proceeds. My invention will be well understood by reference to the following description taken in connection with the accompanying drawing, wherein.

Figure 1:
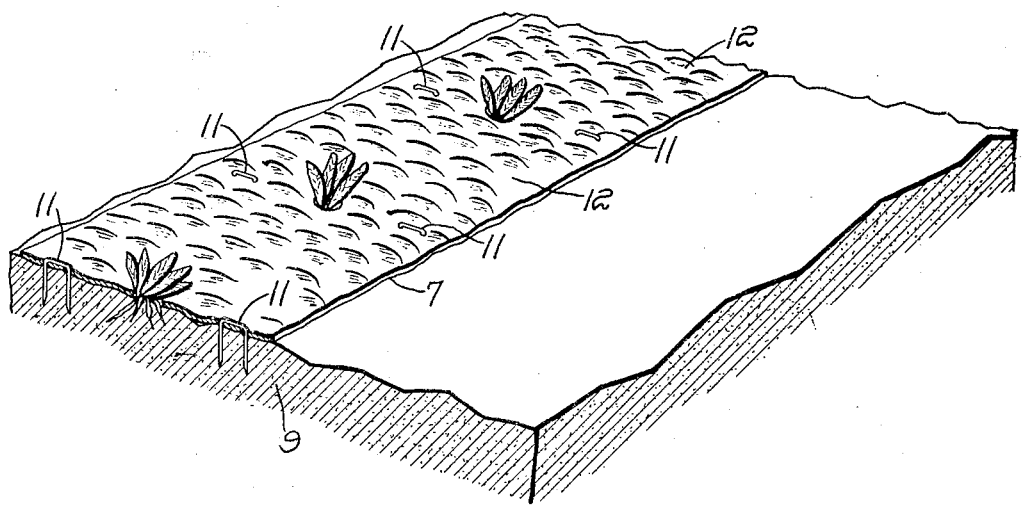
Fig. 1 is a part perspective, part section illustrating in a more or less diagrammatic manner a number of plants mulched in accordance with my invention.
Figure 2:
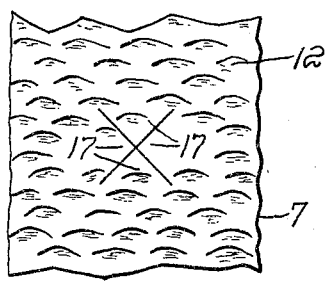
Figs. 2 and 3 are plans of portions of mulch paper illustrative of a method of manipulating the same.

The use as a mulch for plants of paper applied in strips between the rows or over the bed, the plants, in the latter case, growing through suitable openings in the paper, is known and offers well known advantages in discouraging weed growth, preserving ground moisture and the like. In accordance with my invention I utilize as a mulch paper which is made resiliently expansible by suitable crumpling, crinkling or the like, conveniently by craping by the well known roll and doctor method as commonly applied to the production of expansible papers of the heavier grade for wrapping purposes. Thus in Fig. 1 I have illustrated a web 7 of such paper secured in position over a garden bed 9 by means of wire staples 11, the crapings being indicated in an exaggerated and diagrammatic form at 12. The paper may either be applied between rows, the plants growing between the edges of adjacent strips of paper, or openings may be made either in the edges of a strip of paper or through the body thereof, the latter arrangement being illustrated in Fig. 1, to receive the plants.

The paper should be of such character as to permit it to resist the disintegrating action of the weather until its service as a mulch has been availed of and preferably should be of a dark color to absorb heat from the sun. I preferably make use of asphalt-saturated paper prepared as described in the patent to Wheildon No. 1,595,637, August 10, 1926.

The use as a mulch of an expansible paper as described has various advantages as contrasted with the use of plain, non-stretchable paper, among which, without attempting to be exhaustive, may be enumerated the following:—

In applying the paper initially it is tougher and less fragile than non-stretchable paper of equal weight and quality and can be handled with greater impunity without danger of tearing, is easier to spread out over the garden and may be trodden on with less danger of tearing during its application and afterwards. When spread out over the garden it will conform readily to unevenness in the soil. Thus, referring to Fig. 4, I have illustrated a large stone 13. Craped paper will stretch and expand and fit around such an obstruction without a rupture whereas a break would be caused in ordinary paper.

When fastened to the ground, as, for instance, by means of the staples 11, its qualities permit stretching and contraction as the paper is alternately wetted and dried when exposed to the weather and the tears which occur with plain paper are prevented.

The rough surface of the paper providing a number of irregular channels will hold water and guide it to the openings in the mulch surface where the plants are found. There is less danger of erosion due to a shedding of a considerable quantity of water as a stream from the surface of the paper.

On account of the rough surface of the paper there is less reflection of sunlight and consequent greater absorption of solar heat to be transferred to the ground.

Figure 4:
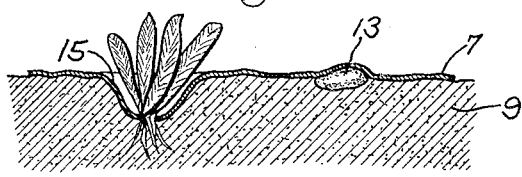
Fig. 4 is a vertical section showing another application of the mulch.

In the case of plants requiring considerable water a cup-like depression may be made, as indicated at 15 in Fig. 4, simply by pushing down on the paper locally, for instance with the foot, and without rupturing the paper. An opening may be made in the bottom of this depression in which the plant may be set.

In case the paper is slit or cut, either to provide an opening for planting or accidentally in its use, the tear is less likely to spread than in the case of plain paper because the rupturing strain will be taken up by a stretching of the crapes of the paper near the end of the slit, and the edge of the paper at the end of the slit will roll up forming a kind of bead which will tend to prevent further tearing.

Figure 3:
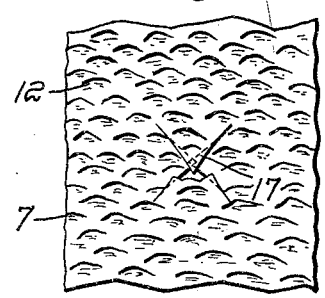

Openings for the plants may be made in the paper either in advance of its application to the garden or extemporaneously as required for use. One type of opening is herein shown by way of example in Fig. 3 consisting of cross-cuts or slashes in the body of the paper forming triangular flaps 17, the ends of which may be raised to permit the passage of the plant, these flaps being an example of one type of cover for an opening in a mulching sheet. As illustrated in Fig. 3, the paper which forms these flaps may be stretched or expanded and when then folded together the margins will overlap as shown in Fig. 3. This possibility permits openings to be made of large size to permit the insertion of plants therethrough and easy handling of the soil adjacent the location of the plant, as, for instance, in closing the soil about the roots, and, after the plant is set, the opening may be closed in greater part, the overlapping of the stretched marginal portions providing a closure, as distinct from an open slit, which will prevent weeds passing up through.

Having thus described my invention and indicated some of the advantages obtained by its use, what I claim as new and desire to secure by Letters Patent I shall express in the following claims.

I claim:

1. That improvement in the art of horticulture which comprises securing in extended position over the soil a covering of weather-resistant crinkled paper resiliently expansible locally and providing discontinuities in said covering for the growth of plants.

2. A new manufacture comprising a suitably prepared and cultivated garden bed, a covering of weather-resistant crinkled paper resiliently expansible locally extended thereover and having discontinuities therein and plants set at the discontinuities.

3. A mulch comprising a web of expansible weather-resistant craped paper cut to provide plant-receiving openings and covers for said openings, said covers being stretchable due to the expansibility of the paper to permit them to lap margins of the openings.

4. That improvement in the art of horticulture which comprises securing in extended position over the soil a covering of resiliently expansible weather-resistant crinkled paper providing water-receiving depressions therein by localized expansion of the paper and growing plants through openings in said depressions.

5. A new manufacture comprising a suitably prepared and cultivated garden bed, a covering of resiliently expansible weather-resistant crinkled paper extended thereover and locally expanded to provide cup-like depressions and having openings in said depressions through which plants grow.

In testimony whereof I have signed my name to this specification.

EDWARD H. ANGIER.